United States Patent Office 2,699,397
Patented Jan. 11, 1955

2,699,397

REFRACTORY MINERAL FIBER

William P. Hahn, North Plainfield, N. J., assignor to Johns-Manville Corporation, New York, N. Y., a corporation of New York No Drawing. Original application November 14, 1950, Serial No. 195,705. Divided and this application September 9, 1952, Serial No. 308,711

5 Claims. (Cl. 106—50)

This invention relates to an improved refractory mineral wool composition having exceptional chemical and thermal stability, and to an efficient method of making the same from a mixture of natural minerals.

This application is a division of my copending application Serial No. 195,705 filed November 14, 1950, now abandoned.

Difficulty has been experienced in attempts to develop a refractory mineral wool composition having suitable properties for use as high temperature insulation and which is adapted for efficient and economical manufacture.

An inherent problem in producing any refractory mineral wool by conventional successive fusing and fiberizing operations, is that during the wool forming operation a substantial quantity of unfiberized particles, including shot, is produced in intermingled relation with the fibers. The presence of such shot or other unfiberized material in adhering admixture with the fibers has a serious adverse effect upon the value of the fibers for use as heat insulation in the form of batts, blankets, or as loose fill insulation.

It has been known for some time that refractory mineral wools can be produced by fiberizing fused natural minerals of alumina-silica composition, and that the refractoriness of the resulting wool is imparted by relatively high ratios of alumina to silica.

One important factor affecting the value of a refractory mineral wool as a heat insulating medium is the composition character of the shot or non-fiberized impurities formed and adhering to the wool during fiberizing operation. It has been found, for example, that it is very difficult, if not impossible, to clean a refractory wool produced by successively fusing and fiberizing the mineral kyanite, for the reason that the unfiberized shot which results from fusing and fiberizing kyanite has a flaky porous structure which seriously interferes with separation of the shot from the fibers by conventional cleaning methods.

An object of the present invention is to provide a tough refractory mineral wool of good chemical and thermal stability for use at temperatures at and above 2000° F.

A further object is to provide a refractory mineral wool composition adapted for fine fiberizing and for ready cleaning and separation from non-fiberized shot.

A specific object is to provide an efficient method of making from a blend of natural minerals clean and fine refractory mineral wool fibers having good chemical and thermal stability.

With the above objects in view, the invention consists in the improved mineral wool and method of making the same which are hereinafter described and more particularly defined by the accompanying claims.

The particular composition and method herein described have developed from the discoverey that there is a narrow range of alumina-silica ratio mineral composition which can be efficiently fiberized to give good yields of suitably fine and clean refractory mineral wool.

An important characteristic of the present refractory mineral fiber composition is that any unfiberized shot which is produced in adhering relation to the fibers during the fiberizing operation has a dense glassy structure such that it can be readily separated from the fibers by a mild and gentle cleaning treatment which does not subject the relatively brittle mineral wool fibers to serious breakdown or reduction of fiber length. Suitable method and apparatus for cleaning the fibers forming the subject of the present invention have been described in the copending patent application of Novotny and Hedges, Serial No. 117,558, filed September 24, 1949, of common ownership, for Method and Apparatus for Cleaning and Opening Fragile Fibers.

The specific discovery forming the basis of the present invention is that good yields of fine clean fibers of adequate length and chemical and thermal stability for high use temperatures can be best produced by successively fusing and fiberizing a blend of natural minerals comprising approximately 100 parts kyanite and 6–12 parts silica by weight. Optimum results are obtained using a blend of 100 parts kyanite and 10 parts silica, with suitable cleaning of the resulting fibers.

It has been further determined that a refractory mineral wool with suitable toughness and chemical and thermal stability to adapt it for use at temperatures at and above 2000° F., should have approximately the following chemical composition: $Al_2O_3$ 51–55%, $SiO_2$ 43–47%, approximately 0.7–1% each of $Fe_2O_3$ and $TiO_2$, and not exceeding 0.5% alkaline earth oxides.

A satisfactory mineral wool made by the present method had the following approximate ultimate analysis: $Al_2O_3$ 52.3%, $SiO_2$ 45.5%, approximately 0.9% each of $Fe_2O_3$ and $TiO_2$, about 0.3% lime and magnesium oxides, and less than 0.1% alkali oxides.

It will be noted that in the stated mineral wool compositions the alumina to silica weight ratio is within the approximate range 1.10–1.30, and that the total alumina plus silica content of the mineral wool approximates 97.0–98%. Mineral wool of this composition is highly refractory and has good chemical and thermal stability. The stated high proportion of silica imparts a glassy dense structure to shot and non-fibrous impurities resulting from the fiberizing operation, and thereby makes it possible to produce a clean wool by a gentle cleaning operation. The stated proportion of alumina to silica, with high total alumina and silica content, also results in high yields of tough fine fibers averaging less than 4 microns in diameter, and in the production of relatively long fibers. By using a blend of domestic kyanite and finely ground silica in the stated proportions, the fibers which resulted had a total alkali oxide content of less than 0.1%, and accordingly had good chemical and thermal stability.

Since the fusion temperature of a mixture of domestic kyanite and ground silica in the proportion of about 10/1 is well above 3000° F., the fiberizing operation is preferably carried out by employing an electric resistance furnace of the type in which the molten liquid acts as a resistance conductor for fusing the blended kyanite-silica mixture to a state of high fluidity. After a charge within the furnace has been fused to a suitably low viscosity, the fiberizing operation is initiated by pouring or tapping off a small stream of the molten liquid from the furnace, and fiberizing either by a conventional steam blowing method or by a suitable spinning method, as for example, a rotating roll spinning method.

Mineral wool fibers which are prepared in accordance with the present composition and method will withstand continuous heating to temperatures of 2000° F. over a 24 hour heating period, without exhibiting any apparent recrystallization at the high temperature. In other words, the devitrification temperature of the fibers is well above 2000° F.

It will be understood that the details given are for the purpose of illustration, not restriction, and that variations within the spirit of the invention are intended to be included in the scope of the appended claims.

What I claim is:

1. A refractory mineral wool which has good chemical and strength stability at temperatures at least as high as 2000° F., having substantially the following composition: $Al_2O_3$ 51.0–55%, $SiO_2$ 43–47.0%, and the balance chiefly $Fe_2O_3$ and $TiO_2$, and produced by fusing a mixture of approximately 100 parts by weight of kyanite and 6–12 parts by weight of silica to a fluid consistency, and fiberizing said fluid.

2. A refractory mineral wool having the following approximate composition: 97.0–98.0% of alumina and silica in the ratio of 1.10–1.30, $Fe_2O_3$ and $TiO_2$ in amount up to 1.0% each, not to exceed 0.5% alkaline earth oxides, and less than 0.1% alkali oxide, and produced by fusing a mixture of approximately 100 parts by weight of kyanite and 6–12 parts by weight of silica to a fluid consistency, and fiberizing said fluid.

3. A refractory mineral wool which has good chemical and strength stability at temperatures at least as high as 2000° F., having the following approximate composition: 52.3% alumina, 45.5% silica, 0.9% $Fe_2O_3$, 0.9 $TiO_2$, 0.3% of a mixture of lime and magnesia, and less than 0.1% alkali oxide and produced by fusing a mixture of approximately 100 parts by weight of kyanite and approximately 10 parts by weight of silica.

4. A refractory mineral wool which has good chemical and thermal stability at temperatures at least as high as 2000° F., having approximately the following composition: $Al_2O_3$ 51.0–55%, $SiO_2$ 43–47.0%, $Fe_2O_3$ and $TiO_2$ in amount up to approximately 1% each, and alkaline earth oxides not exceeding approximately 0.5%, and produced by fusing a mixture of approximately 100 parts by weight of kyanite and 6–12 parts by weight of silica to a fluid consistency, and fiberizing said fluid.

5. A refractory mineral wool which has good chemical and strength stability at temperatures at least as high as 2000° F., having substantially the following composition: $Al_2O_3$ 51.0–55%, $SiO_2$ 43–47.0%, and balance chiefly $Fe_2O_3$ and $TiO_2$, and produced by fusing a finely ground mixture of approximately 100 parts by weight of kyanite and approximately 6–12 parts by weight of silica to a fluid consistency, and fiberizing said fluid.

References Cited in the file of this patent

UNITED STATES PATENTS

| | | |
|---|---|---|
| 2,557,834 | McMullen | June 19, 1951 |

FOREIGN PATENTS

| | | |
|---|---|---|
| 495,654 | Great Britain | 1938 |